J. E. SNEAD & R. A. BURNS.
APPARATUS FOR PREVENTING HORSES FROM CRIBBING.
No. 195,667. Patented Sept. 25, 1877.
FIG. I.
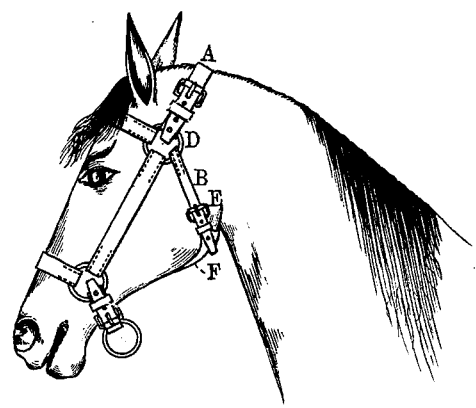
FIG. II.
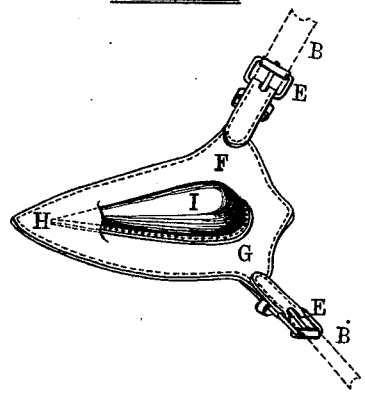
WITNESSES.
INVENTORS.

UNITED STATES PATENT OFFICE.

JOHN E. SNEAD AND ROBERT A. BURNS, OF BALTIMORE, MARYLAND.

IMPROVEMENT IN APPARATUS FOR PREVENTING HORSES FROM CRIBBING.

Specification forming part of Letters Patent No. 195,667, dated September 25, 1877; application filed May 28, 1877.

*To all whom it may concern:*

Be it known that we, JOHN E. SNEAD and ROBERT A. BURNS, both of the city of Baltimore and State of Maryland, have invented certain new and useful Improvements in Devices for Preventing Cribbing or Wind-Sucking in Horses, of which the following is a specification; and we do hereby declare that in the same is contained a full, clear, and exact description of the said invention, reference being had to the accompanying drawing, forming a part of this specification, and in which—

Figure 1 is a view of a halter having our improved device attached thereto, the whole being applied to the head of a horse. Fig. 2 is a perspective view of the device, showing the inner side thereof.

Similar letters of reference indicate similar parts in both figures.

This invention relates to an improvement in devices for preventing cribbing or wind-sucking in horses; and it consists in securing to the headstall or other part of a halter, or to a bridle, in lieu of the ordinary throat-latch, a shield-shaped base, of stiff leather or other suitable material, provided on its upper side with a hard elongated pad, the whole being made to conform to the shape of and fit into the depression or cavity between the lower jaw-bones of the animal, as will hereinafter more fully appear.

In the accompanying drawing, A represents the headstall of an ordinary halter. In lieu of the throat-latch, two straps, B B, are secured to the rings D D, and punched to receive the buckles E E attached to the cribbing-pad F. The cribbing-pad F is composed of a shield-shaped base, G, of stiff leather, preferably made of two pieces stitched together at their edges, the upper piece being slitted at H to receive the point of the hard elongated pad I, which is also stitched to the upper piece of the base G. The toe of the base G is turned upward and the heel is turned downward, as shown, causing the cribbing-pad F to conform as nearly as possible to the shape of the depression between the animal's lower jaw-bones.

Although the cribbing-pad is preferably made of leather, it may be made of any other suitable material; and the base G may be made in one piece, without the slit H, without departing from the invention.

Its operation is very simple, and is as follows: The cribbing-pad is buckled on to fit the cavity between the animal's lower jaw-bones, but not so tightly as to inconvenience or annoy the animal while feeding. Without the pad F, when the animal cribs it seizes the crib or other object with its teeth and draws or sucks its breath with considerable force, causing the said depression or cavity to swell or fill out. When the pad is in place the said depression cannot be filled, and the animal is compelled to release its hold of the crib whenever it attempts to suck, for the reason that the hard elongated pad I and the toe of the base G press against the wind-pipe, causing the animal such annoyance as to produce the result before stated.

Having thus described our improvements, what we claim is—

The cribbing-pad F, composed of the base G and the elongated pad I, and provided with suitable means for attaching it to the headstall of a halter, as shown and described.

In testimony whereof we have hereunto subscribed our names this 16th day of April, in the year of our Lord 1877.

JOHN E. SNEAD.
ROBERT A. BURNS.

Witnesses:
WM. S. HOWARD,
THOS. MURDOCH.